United States Patent
Kwon et al.

(10) Patent No.: US 12,394,321 B2
(45) Date of Patent: Aug. 19, 2025

(54) ELECTRONIC DEVICE CONTROLLING A PLURALITY OF EXTERNAL ELECTRONIC DEVICES PERFORMING RESOURCE OFFLOADING, AND A CONTROL METHOD THEREOF

(71) Applicant: SAMSUNG ELECTRONICS CO., LTD., Suwon-si (KR)

(72) Inventors: Hobum Kwon, Suwon-si (KR); Juwon Ahn, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 456 days.

(21) Appl. No.: 17/564,770

(22) Filed: Dec. 29, 2021

(65) Prior Publication Data

US 2022/0223050 A1     Jul. 14, 2022

Related U.S. Application Data

(63) Continuation of application No. PCT/KR2021/019630, filed on Dec. 22, 2021.

(30) Foreign Application Priority Data

Jan. 13, 2021   (KR) ........................ 10-2021-0004600

(51) Int. Cl.
     *G08G 5/00*      (2006.01)
     *B64U 10/14*      (2023.01)
     (Continued)

(52) U.S. Cl.
     CPC ............. *G08G 5/30* (2025.01); *G05D 1/0022* (2013.01); *G05D 1/0027* (2013.01); *B64U 10/14* (2023.01);
     (Continued)

(58) Field of Classification Search
     CPC .............. B64C 39/024; B64U 2101/30; B64U 2101/31; G05D 1/0022; G05D 1/0027;
     (Continued)

(56) References Cited

U.S. PATENT DOCUMENTS

| 10,040,551 B2 | 8/2018 | Erickson et al. |
| 2016/0189323 A1 | 6/2016 | Wakabayashi et al. |

(Continued)

FOREIGN PATENT DOCUMENTS

| KR | 10-1599053 | 3/2016 |
| KR | 10-1640204 | 7/2016 |

(Continued)

OTHER PUBLICATIONS

Search Report dated Mar. 30, 2022 in counterpart International Patent Application No. PCT/KR2021/0196630 and English-language translation.

(Continued)

*Primary Examiner* — Angela Y Ortiz
*Assistant Examiner* — Aaron K McCullers
(74) *Attorney, Agent, or Firm* — Nixon & Vanderhye, P.C

(57) ABSTRACT

An example electronic device may include a communication module comprising communication circuitry, and at least one processor, wherein the at least one processor may be configured to control the communication module to acquire first information related to a suspected event from a first external electronic device, determine a second external electronic device to be dispatched to a location where the suspected event has occurred, control the second external electronic device, acquire second information related to an analysis result of the suspected event from the first external electronic device, and perform a subsequent procedure based on the acquired second information.

10 Claims, 16 Drawing Sheets

(51) Int. Cl.
*B64U 101/57* (2023.01)
*G05D 1/00* (2024.01)
*G08G 5/30* (2025.01)

(52) U.S. Cl.
CPC .... *B64U 2101/57* (2023.01); *B64U 2201/102* (2023.01); *B64U 2201/104* (2023.01)

(58) Field of Classification Search
CPC ........ G06V 20/52; G06V 20/56; G06V 20/58; G06V 40/20; G06V 40/23; G06V 40/25; G06V 40/28; G06T 2207/30232; G08B 13/19602; G08B 13/19608; G08B 13/19613; G08B 13/19615; G08B 13/19645; G08B 13/19652; G08B 13/19663; G08G 5/003; G08G 5/0073; H04N 23/00
USPC ........ 348/143, 144, 152; 396/14, 427; 701/3
See application file for complete search history.

(56) References Cited

U.S. PATENT DOCUMENTS

| | | | | |
|---|---|---|---|---|
| 2016/0266577 | A1* | 9/2016 | Kerzner | G08B 13/19645 |
| 2017/0174343 | A1 | 6/2017 | Erickson et al. | |
| 2017/0187993 | A1* | 6/2017 | Martch | G01S 1/00 |
| 2017/0337791 | A1* | 11/2017 | Gordon-Carroll | H04W 4/023 |
| 2019/0384283 | A1* | 12/2019 | Chowdhary | G05D 1/0038 |
| 2020/0053324 | A1* | 2/2020 | Deyle | G01C 21/20 |
| 2020/0098273 | A1* | 3/2020 | Kim | G06V 20/17 |
| 2020/0193589 | A1* | 6/2020 | Peshlov | G06N 3/08 |

FOREIGN PATENT DOCUMENTS

| | | |
|---|---|---|
| KR | 10-2016-0097492 | 8/2016 |
| KR | 10-1753804 | 6/2017 |
| KR | 10-1851539 | 4/2018 |
| KR | 10-2018-0067014 | 6/2018 |
| KR | 10-2018-0067785 | 6/2018 |
| KR | 10-1931298 | 12/2018 |
| KR | 10-2020-0072387 | 6/2020 |

OTHER PUBLICATIONS

Written opinion dated Mar. 30, 2022 in counterpart International Patent Application No. PCT/KR2021/0196630 and English-language translation.

* cited by examiner

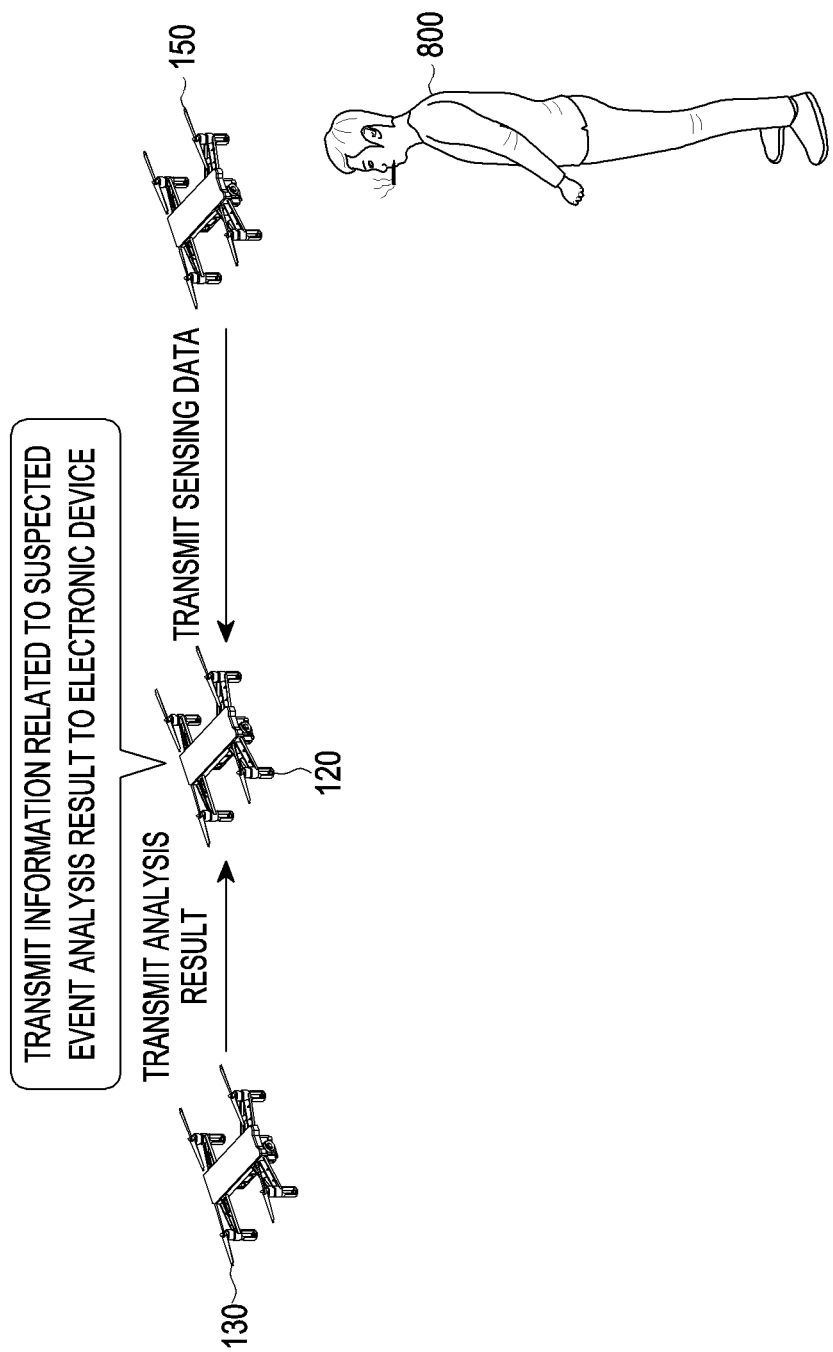

ELECTRONIC DEVICE CONTROLLING A PLURALITY OF EXTERNAL ELECTRONIC DEVICES PERFORMING RESOURCE OFFLOADING, AND A CONTROL METHOD THEREOF

CROSS-REFERENCE TO RELATED APPLICATIONS

This application is a continuation of International Application No. PCT/KR2021/019630 designating the United States, filed on Dec. 22, 2021, in the Korean Intellectual Property Receiving Office and claiming priority to Korean Patent Application No. 10-2021-0004600, filed on Jan. 13, 2021, in the Korean Intellectual Property Office, the disclosures of each of which are incorporated by reference herein in their entireties.

BACKGROUND

Field

The disclosure relates to an electronic device for controlling multiple external electronic devices performing resource offloading, and a method for controlling the same.

Description of Related Art

Various services and additional functions provided through electronic devices, for example, mobile electronic devices such as drones, are gradually increasing. In order to increase the utility of such electronic devices and to satisfy various user demands, communication service providers or electronic device manufacturers are competitively developing electronic devices to provide various functions and to differentiate themselves from other companies. As a result, the level of various functions provided through electronic devices are on the increase.

Conventional technologies for monitoring specific actions or behaviors using drones or robots use a "data server", which may include a central analysis server, in order to recognize or analyze images. However, it may cost a substantial amount of money to construct and use such a central analysis server environment. For example, when an electronic device (for example, server) is used to analyze acquired images, an external electronic device (for example, drone) needs to transmit images acquired by the external electronic device to the electronic device via a specific communication network (for example, 5G communication network). In this case, the data communication cost may increase to transmit acquired images. Alternatively, if a single drone incorporates all of various functions in order to analyze specific actions or behaviors by a flying device (for example, drone), the weight of the device may increase, thereby causing a result inappropriate for the purpose of the flying device. In addition, if a smartphone is used to analyze images acquired by the drone, the user of the smartphone may be able to check images of other users, thereby causing the problem of privacy infringement.

SUMMARY

Embodiments of the disclosure provide an electronic device (for example, server) wherein an image acquired by a first electronic device (for example, first drone) is analyzed by a second electronic device (for example, second drone) positioned near the first electronic device, the result is acquired by the first electronic device (for example, first drone) from the second electronic device (for example, second drone) through short-range communication, and information related to the result of analysis is transmitted to the electronic device (for example, server) such that the user's behavior can be monitored at a lower cost than in the case of monitoring the user's behavior using a central analysis server (for example, in the case of transmitting information (for example, sensing data) related to a suspected event and the acquired image) to the central analysis server via a specific communication network).

Embodiments of the disclosure may provide a method for controlling an electronic device (for example, server), wherein an image acquired by a first electronic device (for example, first drone) is analyzed by a second electronic device (for example, second drone) positioned near the first electronic device, the result is acquired by the first electronic device (for example, first drone) from the second electronic device (for example, second drone) through short-range communication, and information related to the result of analysis is transmitted to the electronic device (for example, server) such that the user's behavior can be monitored at a lower cost than in the case of monitoring the user's behavior using a central analysis server (for example, in the case of transmitting information (for example, sensing data) related to a suspected event and the acquired image) to the central analysis server via a specific communication network).

An electronic device according to an example embodiment of the disclosure may include: a communication module comprising communication circuitry, and at least one processor, wherein the at least one processor is configured to: control the communication module to acquire first information related to a suspected event from a first external electronic device, determine a second external electronic device to be dispatched to a location where the suspected event has occurred, control the second external electronic device so that the determined second external electronic device is dispatched to a vicinity of the location where the suspected event has occurred, acquire second information related to an analysis result of the suspected event from the first external electronic device after controlling the second external electronic device to be dispatched to the vicinity of the location where the suspected event has occurred, and perform a subsequent procedure based on the acquired second information.

A method of controlling an electronic device according to an example embodiment of the disclosure may include: acquiring first information related to a suspected event from a first external electronic device through a communication module, determining a second external electronic device to be dispatched to a location where the suspected event has occurred, controlling the second external electronic device so that the determined first external electronic device is dispatched to the vicinity of the location where the suspected event has occurred, acquiring second information related to an analysis result of the suspected event from the first external electronic device after controlling the second external electronic device to be dispatched to the vicinity of the location where the suspected event has occurred, and performing a subsequent procedure based on the acquired second information.

According to various example embodiments of the disclosure, an image acquired by a first electronic device (for example, first drone) is analyzed by a second electronic device (for example, second drone) positioned near the first electronic device, the result is acquired by the first electronic device (for example, first drone) from the second electronic device (for example, second drone) through short-range communication, and information related to the result of analysis is transmitted to an electronic device (for example, server) such that the user's behavior can be monitored at a lower cost than in the case of monitoring the user's behavior using a central analysis server (for example, in the case of transmitting information (for example, sensing data) related to a suspected event and the acquired image) to the central analysis server via a specific communication network).

It will be apparent to those skilled in the art that advantageous effects according to various embodiments are not limited to the above-mentioned advantageous effects, and various advantageous effects are incorporated in the disclosure.

BRIEF DESCRIPTION OF THE DRAWINGS

The above and other aspects, features and advantages of certain embodiments of the present disclosure will be more apparent from the following detailed description, taken in conjunction with the accompanying drawings, in which:

FIGS. 8A, 8B and 8C are diagrams illustrating an example monitoring method according to various embodiments.

DETAILED DESCRIPTION

Figure 1A:
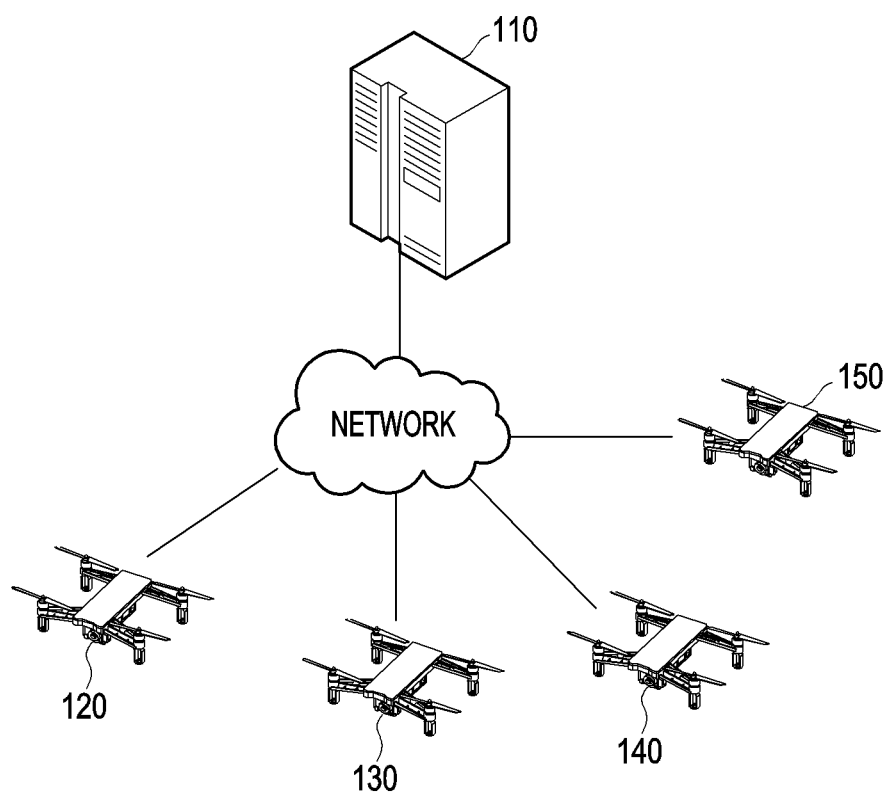
FIGS. 1A and 1B are diagrams illustrating an example network system according to various embodiments.
Figure 1B:
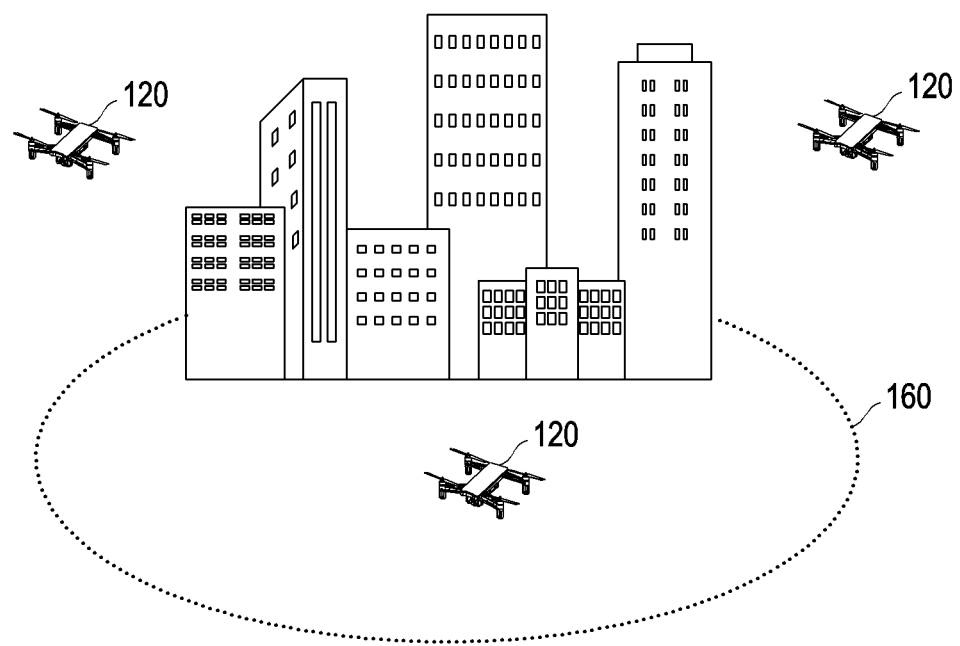

FIGS. 1A and 1B are diagrams illustrating an example network system according to various embodiments.

Referring to FIG. 1A, an electronic device 110 (e.g., a server) according to an embodiment of the disclosure may be operatively connected to a plurality of external electronic devices (e.g., a first external electronic device 120, a second external electronic device, a third external electronic device 140, and a fourth external electronic device 150) through a network. The network according to an embodiment of the disclosure may include a first network (e.g., a short-range communication network such as BLUETOOTH™, wireless fidelity (Wi-Fi) direct, or infrared data association (IrDA)) or a second network (e.g., a telecommunications network such as a legacy cellular network, a 5G network, a next-generation communications network, the Internet, or a computer network (e.g., LAN or WAN)). As illustrated in FIG. 1B, an external electronic device (e.g., the first external electronic device 120) according to an embodiment of the disclosure may move within a specific area (e.g., an apartment complex) 160, and may monitor a user's behavior. The first external electronic device 120 according to an embodiment of the disclosure may be an electronic device having lower specification components (e.g., a processor and a camera) than the second external electronic device 130. The external electronic devices (e.g., the first external electronic device 120, the second external electronic device 130, the third external electronic device 140, and the fourth external electronic device 150) according to an embodiment of the disclosure will be described in greater detail below.

Figure 2A:
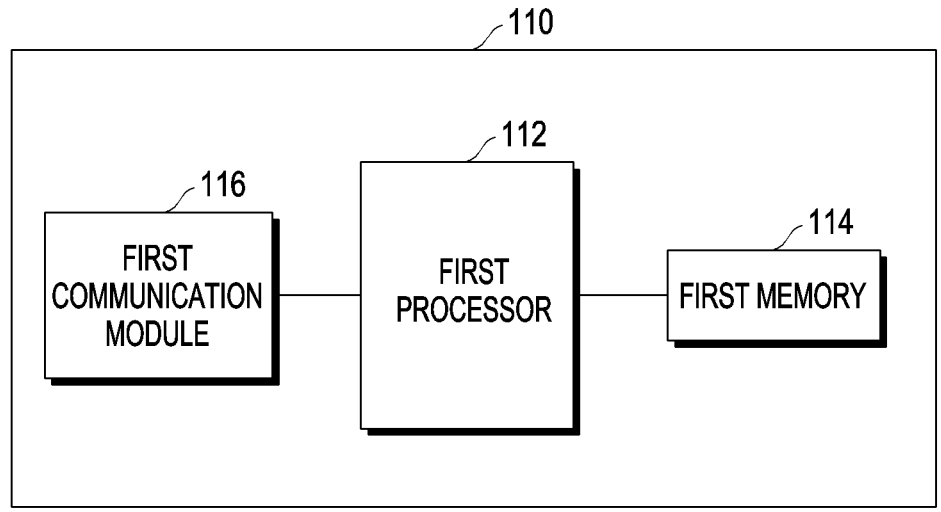
FIG. 2A is a block diagram illustrating an example configuration of an electronic device (e.g., a server) according to various embodiments.

FIG. 2A is a block diagram illustrating an example configuration of an electronic device (e.g., a server) according to various embodiments.

Referring to FIG. 2A, the electronic device 110 according to an embodiment of the disclosure may include a first processor (e.g., including processing circuitry) 112, a first memory 114, and a first communication module (e.g., including communication circuitry) 116. The first processor 112 according to an embodiment of the disclosure may include various processing circuitry and execute, for example, software (e.g., a program) to at least one other component (e.g., hardware or software components) of the electronic device 110 connected to the first processor 112, and may perform various data processing or operations. According to an embodiment of the disclosure, as at least a part of data processing or operation, the processor 112 may load commands or data obtained from another component (e.g., the first communication module 116) to the first memory 114, may process the commands or data stored in the first memory 114, and may store resultant data in the first memory 114. According to an embodiment of the disclosure, the first processor 112 may include a main processor (e.g., a central processing unit or an application processor) and an auxiliary processor (e.g., a graphic processing unit, an image signal processor, a sensor hub processor, and/or a communication processor) capable of operating independently or together with the main processor. The auxiliary processor may be configured to use less power than the main processor or to be specialized in a designated function. The auxiliary processor according to an embodiment of the disclosure may be implemented separately from or as a part of the main processor. The auxiliary processor may control at least some of functions or states related to at least one component (e.g., the first memory 114) among components of the electronic device 101, on behalf of, for example, the main processor while the main processor is in an inactive (e.g., sleep) state or in conjunction with the main processor while the main processor is in an active (e.g., application execution) state.

The first memory 114 according to an embodiment of the disclosure may store various types of data used by at least one component (e.g., the processor 112 or the first communication module 116) of the electronic device 110. The data may include, for example, input data or output data for software (e.g., a program) and commands related thereto. The first memory 114 according to the embodiment of the disclosure may include a volatile memory or a non-volatile memory. The program may be stored as software in a memory, and may include, for example, an operating system, middleware, or an application.

The first communication module 116 according to an embodiment of the disclosure may include various communication circuitry and support establishment of a wireless communication channel between the electronic device 110 and the external electronic devices (e.g., the first external electronic device 120, the second external electronic device 130, the third external electronic device 140, and the fourth external electronic device 150), and may support to perform communication through the established communication channel. The first communication module 116 according to an embodiment of the disclosure may include one or more communication processors (e.g., including communication processing circuitry) that operate independently of the first processor 112 (e.g., an application processor) and support direct (e.g., wired) communication or wireless communication. According to an embodiment of the disclosure, the first communication module 116 may include a wireless communication module (e.g., cellular communication module, a short-range wireless communication module, or global navigation satellite system (GNSS)). According to an embodiment of the disclosure, the first communication module 116 may communicate with the external electronic devices (e.g., the first external electronic device 120, the second external electronic device 130, the third external electronic device 140, and the fourth external electronic device 150) through the first network (e.g., a short-range communication network such as BLUETOOTH™, wireless fidelity (Wi-Fi) direct, or infrared data association (IrDA)) or a second network (e.g., a telecommunications network such as a legacy cellular network, a 5G network, a next-generation communications network, the Internet, or a computer network (e.g., LAN or WAN)). The wireless communication module according to an embodiment of the disclosure may support a 5G network after a 4G network and a next-generation communication technology, for example, a new radio (NR) access technology. The NR access technology may support a high-speed transmission of high-capacity data (enhanced mobile broadband (eMBB)), minimization of terminal power and access of multiple terminals (massive machine type communications (mMTC)), or high reliability and low latency (ultra-reliable and low-latency communications (URLLC)). The wireless communication module according to an embodiment of the disclosure may support a high frequency band (e.g., mmWave band) to achieve, for example, a high data rate. The wireless communication module according to an embodiment of the disclosure may support various technologies for securing performance in a high frequency band, for example, beamforming, massive multiple-input and multiple-output (MIMO), full dimensional MIMO (FD-MIMO), an array antenna, analog beam-forming, or a large scale antenna.

Figure 2B:
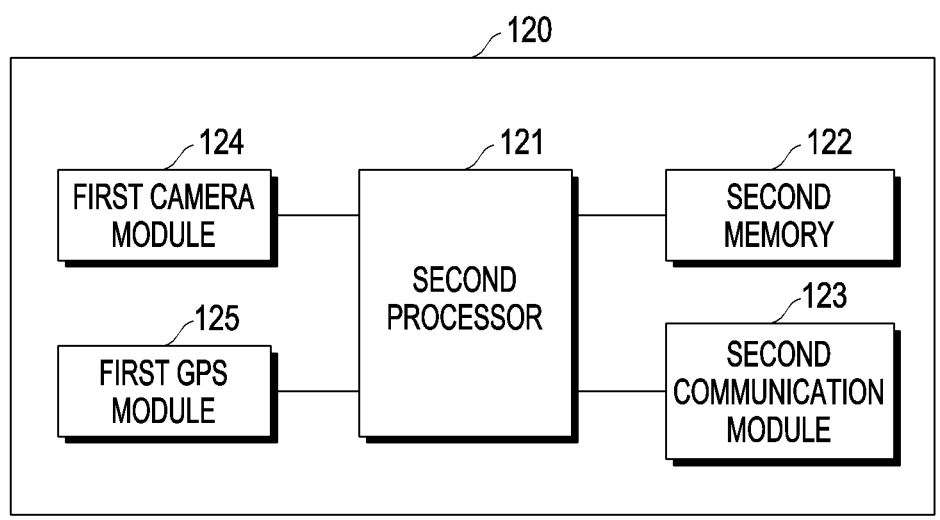
FIG. 2B is a block diagram illustrating an example configuration of a first external electronic device (e.g., a first drone) according to various embodiments.

FIG. 2B is a block diagram illustrating an example configuration of a first external electronic device (e.g., a first drone) according to various embodiments.

Referring to FIG. 2B, the first external electronic device 120 according to an embodiment of the disclosure may include a second processor (e.g., including processing circuitry) 121, a second memory 122, a second communication module (e.g., including communication circuitry) 123, a first camera module (e.g., including a camera) 124, and a first global position system (GPS) module (e.g., including GPS circuitry) 125. The descriptions of the first processor 112, the first memory 114, and the first communication module 116 may be equally applied to the second processor 121, the second memory 122, and the second communication module 123 according to an embodiment of the disclosure, respectively. The second processor 121 according to an embodiment of the disclosure may include a processor with lower performance than the third processor 131 of FIG. 2C.

At least one first camera module 124 according to an embodiment of the disclosure may include at least one cameral and capture a still image or a moving image. The at least one first camera module 124 according to an embodiment of the disclosure may include one or more lenses, image sensors (e.g., charge coupled device (CCD), CMOS devices), image signal processors, or flashes. The at least one first camera module 124 according to an embodiment of the disclosure may receive a camera control signal from the second processor 121. The at least one first camera module 124 according to an embodiment of the disclosure may include a camera module having lower performance (e.g., lower resolution) than the second camera module 144 of FIG. 2D.

The first GPS module 125 according to an embodiment of the disclosure may include various GPS circuitry and detect distance information from three or more GPS satellites and time information for which the distance information is specified, and may then apply triangulation to the detected distance information to detect 3D location information according to latitude, longitude, and altitude.

Figure 2C:
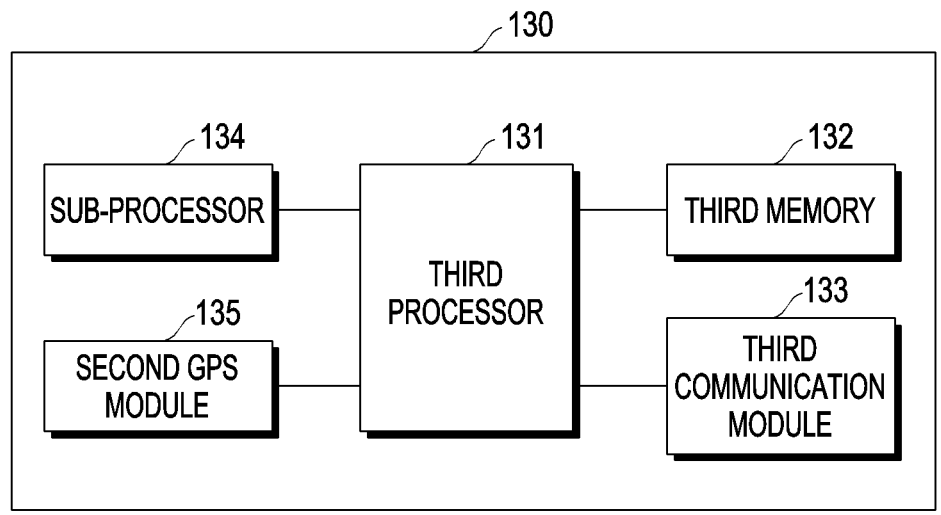
FIG. 2C is a block diagram illustrating an example configuration of a second external electronic device (e.g., a second drone) according to various embodiments.

FIG. 2C is a block diagram illustrating an example configuration of a second external electronic device (e.g., a second drone) according to various embodiments. Referring to FIG. 2C, the second external electronic device 130 according to an embodiment of the disclosure may include a third processor (e.g., including processing circuitry) 131, a third memory 132, a third communication module (e.g., including communication circuitry) 133, a sub-processor (e.g., including processing circuitry) 134, and a second GPS module (e.g., including GPS circuitry) 135. The descriptions of the first processor 112, the first memory 114, and the first communication module 116 may be equally applied to the third processor 131, the third memory 132, and the third communication module 133 according to an embodiment of the disclosure, respectively. The third processor 131 according to an embodiment of the disclosure may include a processor with higher performance than the second processor 121 of FIG. 2B.

The sub-processor 134 according to an embodiment of the disclosure may include various processing circuitry including, for example, an auxiliary processor (e.g., a graphic processing unit, an image signal processor, and/or a sensor hub processor) that can be operated independently or together with the third processor 131. The sub-processor 134 according to an embodiment of the disclosure may include a graphic processing unit (GPU) and/or a neural processing unit (NPU). Additionally or alternatively, the sub-processor 134 according to an embodiment of the disclosure may be configured to use less power than the main processor (e.g., the third processor 131) or to be specialized for a specified function. The sub-processor 134 according to an embodiment of the disclosure may be implemented separately from or as a part of the main processor (e.g., the third processor 131). The sub-processor 134 according to an embodiment of the disclosure may control at least some of functions or states related to at least one component (e.g., the first memory 114) among components of the second external electronic device 130, on behalf of, for example, the third processor 131 while the third processor 131 is in an inactive (e.g., sleep) state or in conjunction with the third processor 131 while the third processor 131 is in an active (e.g., application execution) state.

Figure 2D:
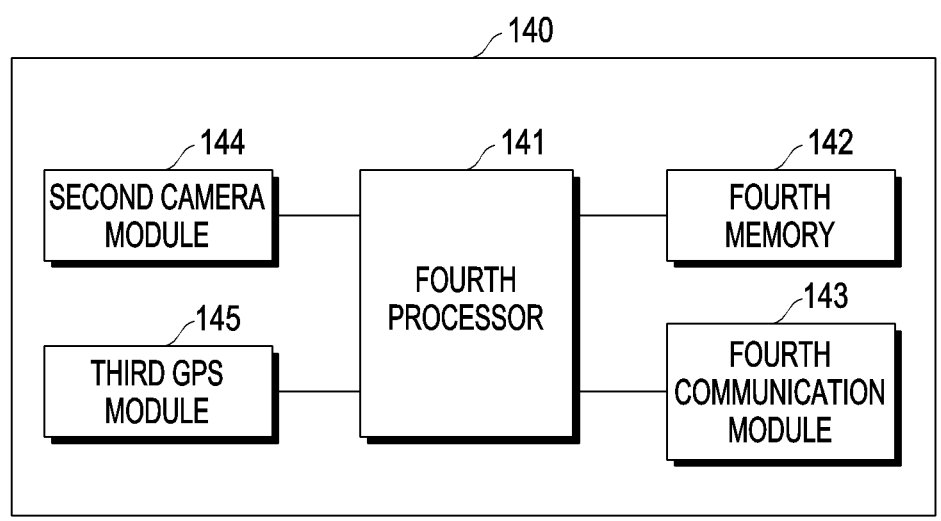
FIG. 2D is a block diagram illustrating an example configuration of a third external electronic device (e.g., a third drone) according to various embodiments.

FIG. 2D is a block diagram illustrating an example configuration of the third external electronic device 140 (e.g., a third drone) according to various embodiments. Referring to FIG. 2D, the third external electronic device 140 according to an embodiment of the disclosure may include a fourth processor (e.g., including processing circuitry) 141, a fourth memory 142, a fourth communication module (e.g., including communication circuitry) 143, a second camera module (e.g., including a camera) 144, and a third GPS module (e.g., including GPS circuitry) 145. The descriptions of the first processor 112, the first memory 114, and the first communication module 116 may be equally applied to the fourth processor 141, the fourth memory 142, and the fourth communication module 143 according to an embodiment of the disclosure, respectively. At least one second camera module 144 according to an embodiment of the disclosure may include a camera module having higher performance than the first camera module 124. The description of the first GPS module 125 may be equally applied to the third GPS module 145 according to an embodiment of the disclosure.

Figure 2E:
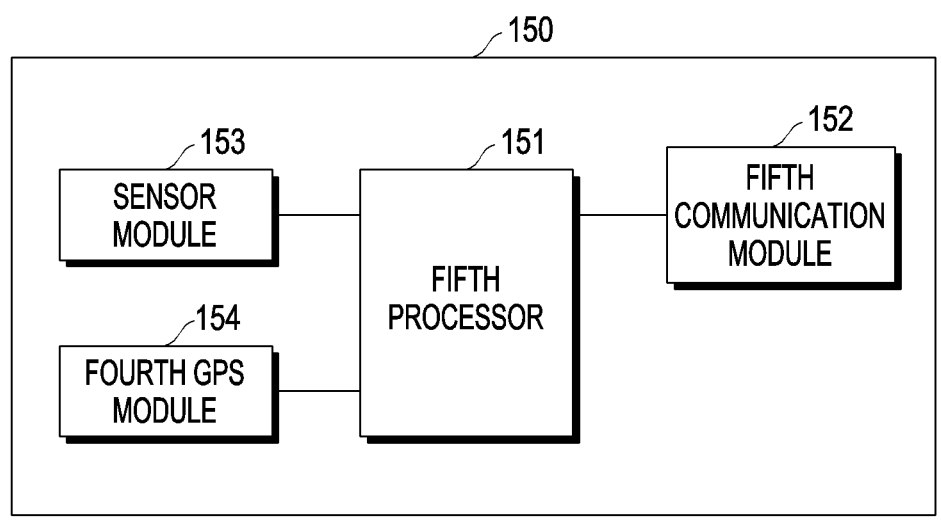
FIG. 2E is a block diagram illustrating an example configuration of a fourth external electronic device (e.g., a fourth drone) according to various embodiments.

FIG. 2E is a block diagram illustrating an example configuration of the fourth external electronic device 150 (e.g., a fourth drone) according to various embodiments. Referring to FIG. 2E, the fourth external electronic device 150 according to an embodiment of the disclosure may include a fifth processor (e.g., including processing circuitry) 151, a fifth communication module (e.g., including communication circuitry) 152, a sensor module (e.g., including a sensor) 153, and a fourth GPS module (e.g., including GPS circuitry) 154. The descriptions of the first processor 112 and the first communication module 116 may be equally applied to the fifth processor 151 and the fifth communication module 152 according to an embodiment of the disclosure, respectively. The description of the first GPS module 125 may be equally applied to the fourth GPS module 154 according to an embodiment of the disclosure.

The sensor module 153 according to an embodiment of the disclosure may include various sensors and detect an operating state (e.g., power or temperature) of the fourth external electronic device 150 or an external environmental state (e.g., user state), and may generate an electrical signal or data value corresponding to the detected state. The sensor module 153 according to an embodiment of the disclosure may include, for example, a cigarette smoke detection sensor. The cigarette smoke detection sensor according to an embodiment of the disclosure may include at least one of a semiconductor-type sensor and a photoelectric sensor. The semiconductor-type sensor according to an embodiment of the disclosure may detect cigarette smoke using a semiconductor that responds to gases such as carbon monoxide, carbon dioxide, or nicotine, and may also detect a small amount of cigarette smoke (e.g., ppm unit). The photoelectric sensor according to an embodiment of the disclosure may use the principle that cigarette smoke blocks or reflects light, and may sense the concentration of cigarette smoke according to the degree of scattering of light. In addition, the sensor module 153 according to an embodiment of the disclosure may include, for example, and without limitation, a gesture sensor, a gyro sensor, a barometric pressure sensor, a magnetic sensor, an acceleration sensor, a grip sensor, a proximity sensor, a color sensor, an infrared (IR) sensor, a biosensor, a temperature sensor, a humidity sensor, and/or an illuminance sensor, or the like.

Figure 3:
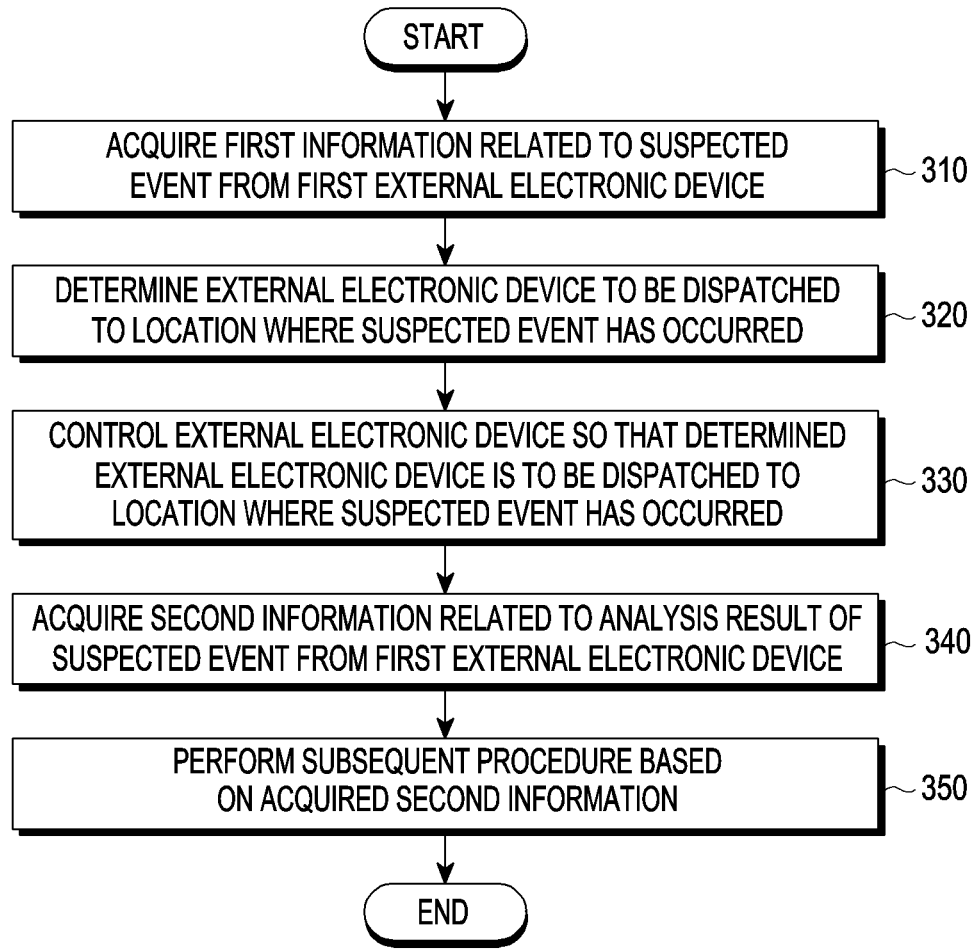
FIG. 3 is a flowchart illustrating an example operation of an electronic device that monitors a user's behavior according to various embodiments.
Figure 4A:
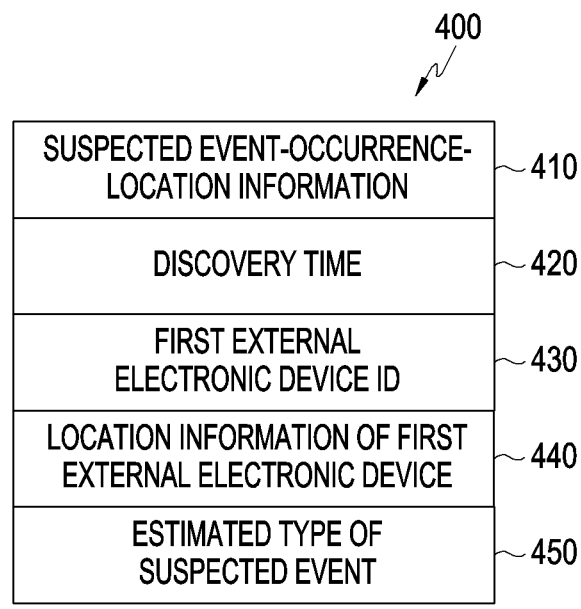
FIG. 4A is a diagram illustrating an example of first information related to a suspected event obtained by an electronic device from a first external electronic device according to various embodiments.
Figure 4B:
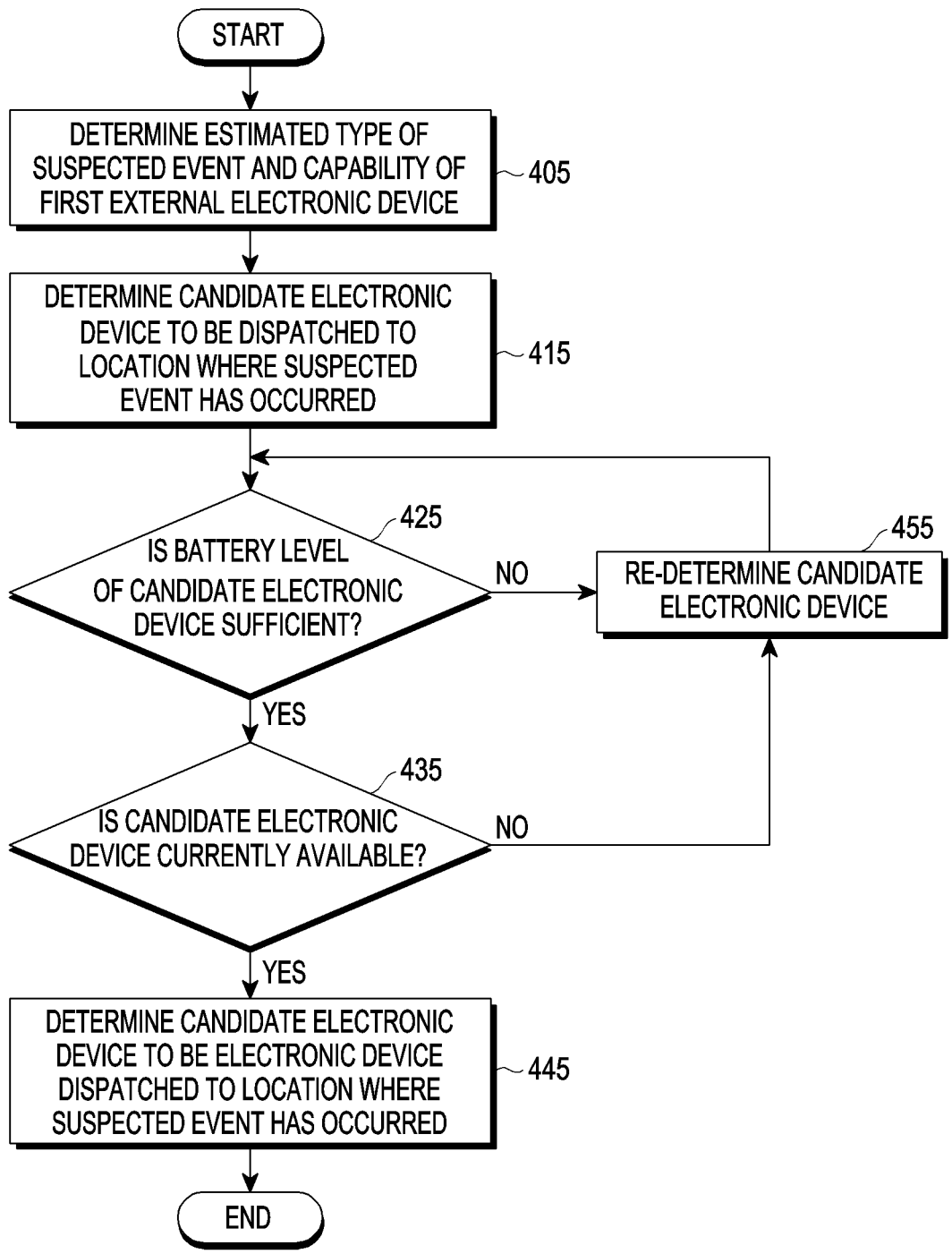
FIG. 4B is a flowchart illustrating an example operation of an electronic device that determines a second external electronic device to be dispatched to a location where a suspected event has occurred, according to various embodiments.

FIG. 3 is a flowchart illustrating an example operation of an electronic device that monitors a user's behavior according to various embodiments. FIG. 4A is a diagram illustrating an example of first information related to a suspected event obtained by an electronic device from a first external electronic device according to various embodiments. FIG. 4B is a flowchart illustrating an example operation of an electronic device that determines a second external electronic device to be dispatched to a location where a suspected event occurs, according to various embodiments.

Referring to FIG. 3, the electronic device 110 according to an embodiment of the disclosure may obtain (e.g., acquire) first information related to a suspected event from the first external electronic device 120 in operation 310. The suspected event according to an embodiment of the disclosure may include smoking of a pedestrian and/or a bowel movement of a companion dog. The first external electronic device 120 according to an embodiment of the disclosure may monitor (e.g., image analysis after acquiring an image) a still user or a walking user. When smoke emission is detected from a user who is walking or in a stationary state during monitoring (e.g., when an object moving irregularly around the user is detected), the first external electronic device 120 according to an embodiment of the disclosure may determine that a suspected smoking event has occurred. When the companion animal does not move for a predetermined time or longer during monitoring, the first external electronic device 120 according to an embodiment of the disclosure may determine that a suspected event for the bowel movement of the companion animal has occurred. The first external electronic device 120 according to an embodiment of the disclosure may monitor the surroundings of the first external electronic device 120 using various algorithms such as a moving object detection method to detect a suspected event. When such a suspected event occurs, the first external electronic device 120 according to an embodiment of the disclosure may transmit first information related to the suspected event to the electronic device 110 as shown in FIG. 4A.

Referring to FIG. 4A, the first information according to an embodiment of the disclosure may include at least one piece of information among suspected event-occurrence-location information 410, information 420 on discovery time, identification information 430 of the first external electronic device 120, location information 440 of the first external electronic device 120, and information 450 on the estimated type of the suspected event. The suspected event-occurrence-location information 410 and the location information 440 of the first external electronic device 120 according to an embodiment of the disclosure may be the same or different from each other. The suspected event-occurrence-location information 410 according to an embodiment of the disclosure may be acquired by the first external electronic device 120. For example, when a suspected event is detected, the first external electronic device 120 according to an embodiment of the disclosure may move to a location in the vicinity of which the suspected event is detected, and may acquire information on a location where the suspected event has occurred through the first GPS module 125. The information 420 on the discovery time according to an embodiment of the disclosure may include information on the first time (e.g., 14:00:00:00) at which the suspected event has occurred. The identification information 430 of the first external electronic device 120 according to an embodiment of the disclosure may be stored in the second memory 122. The location information of the first external electronic device 120 according to an embodiment of the disclosure may include location information (e.g., latitude, longitude, and altitude) at the time the suspected event is detected. The information 450 on the estimated type of the suspected event according to the embodiment of the disclosure may include, for example, the type of the estimated suspected event, such as a suspected smoking event or a suspected defecation event.

In operation 320, the electronic device 110 according to an embodiment of the disclosure may determine an external electronic device to be dispatched to the location where the suspected event has occurred. When it is detected that a suspected smoking event has occurred as the estimated suspected event, the electronic device 110 according to an embodiment of the disclosure may determine an external electronic device (e.g., the second external electronic device 130) for determining whether the suspected smoking event has actually occurred. The electronic device 110 according to an embodiment of the disclosure may determine the second external electronic device 130 including GPU and/or NPU to be the external electronic device for determining whether the suspected smoking event has actually occurred, in order to analyze an image captured by the first external electronic device 120 in detail. In order to determine (or estimate) how the first external electronic device 120 detects the suspected smoking event, the electronic device 110 according to an embodiment of the disclosure may determine the capability of the first external electronic device 120 using the identification information 430 of the first external electronic device and a capability database of the first external electronic device 120 stored in the first memory 114. For example, when it is determined that the first external electronic device 120 is a device including a low-performance camera, the electronic device 110 according to an embodiment of the disclosure may determine that the occurrence of the suspected smoking event has been detected (or estimated) based on an image captured using the low-performance camera. In this case, the electronic device 110 according to an embodiment of the disclosure may determine the second external electronic device 130 including GPU and/or NPU to be the external electronic device for determining whether the suspected smoking event has actually occurred, in order to analyze the image captured by the first external electronic device 120 in detail. When operation 320 is described with reference to FIG. 4B, in operation 405, the electronic device 110 according to an embodiment of the disclosure may determine the estimated type of the suspected event and the capability of the first external electronic device 120. The electronic device 110 according to an embodiment of the disclosure may determine the estimated type (e.g., suspected smoking event) of the suspected event and the capability of the first external electronic device 120 based on first information transmitted from the first external electronic device 120. In operation 415, the electronic device 110 according to an embodiment of the disclosure may determine a candidate electronic device to be dispatched to the location where the suspected event has occurred. The electronic device 110 according to an embodiment of the disclosure may determine that the suspected smoking event has occurred based on the image obtained by the first external electronic device 120 using the low-performance camera. In this case, in order to analyze the image captured by the first external electronic device 120 in detail, the second external electronic device 130 including GPU and/or NPU may be determined to be a candidate electronic device for determining whether the suspected smoking event has actually occurred. When there are a plurality of electronic devices including GPU and/or NPU, any one electronic device having the highest performance among the plurality of electronic devices may be determined to be the candidate electronic device. For example, among the plurality of electronic devices, the electronic device having the highest level of GPU performance that can be expressed numerically may be determined to be the candidate electronic device. In operation 425, the electronic device 110 according to an embodiment of the disclosure may determine whether the battery level of the candidate electronic device is sufficient. The electronic device 110 according to an embodiment of the disclosure may acquire information on the battery level of the candidate electronic device. The electronic device 110 according to an embodiment of the disclosure may determine whether the candidate electronic device is currently available when the battery level of the candidate electronic device is greater than or equal to a predetermined level (e.g., when the remaining charge amount is 50% or higher). When the battery level of the candidate electronic device is greater than or equal to the predetermined level (operation 425—YES), in operation 435, the electronic device 110 according to an embodiment of the disclosure may determine whether the candidate electronic device is currently available. The electronic device 110 according to an embodiment of the disclosure may determine whether the candidate electronic device is currently performing another task. To this end, the electronic device 110 according to an embodiment of the disclosure may transmit a message inquiring whether the other task is currently being performed to the candidate electronic device, and may receive a response to the message from the candidate electronic device. The electronic device 110 according to an embodiment of the disclosure may determine whether the candidate electronic device is currently performing the other task, based on the received response. When the candidate electronic device is currently available (operation 435—YES), in operation 445, the electronic device 110 according to an embodiment of the disclosure may determine the candidate electronic device to be the electronic device to be dispatched to the location where the suspected event has occurred. When the battery level of the candidate electronic device is less than or equal to the predetermined level (operation 425—NO) or when the candidate electronic device is currently performing the other task (operation 435—NO), in operation 455, the electronic device 110 according to an embodiment of the disclosure may re-determine the candidate electronic device. For example, instead of the second external electronic device 130 as the candidate electronic device, the third external electronic device 140 having the high-performance camera may be determined again to be the candidate electronic device.

Referring back to FIG. 3, in operation 330, the electronic device 110 according to an embodiment of the disclosure may control the external electronic device so that the determined external electronic device (e.g., the second external electronic device 120) is to be dispatched to the location where the suspected event has occurred. The electronic device 110 according to an embodiment of the disclosure may transmit the location information 440 of the first external electronic device included in the first information acquired from the first external electronic device 120 to the external electronic device to be dispatched to the location where the suspected event has occurred. According to an embodiment of the disclosure, the external electronic device to be dispatched to the location where the suspected event has occurred may move to the corresponding location using the location information 440 of the first external electronic device transmitted from the electronic device 110.

Figure 6:
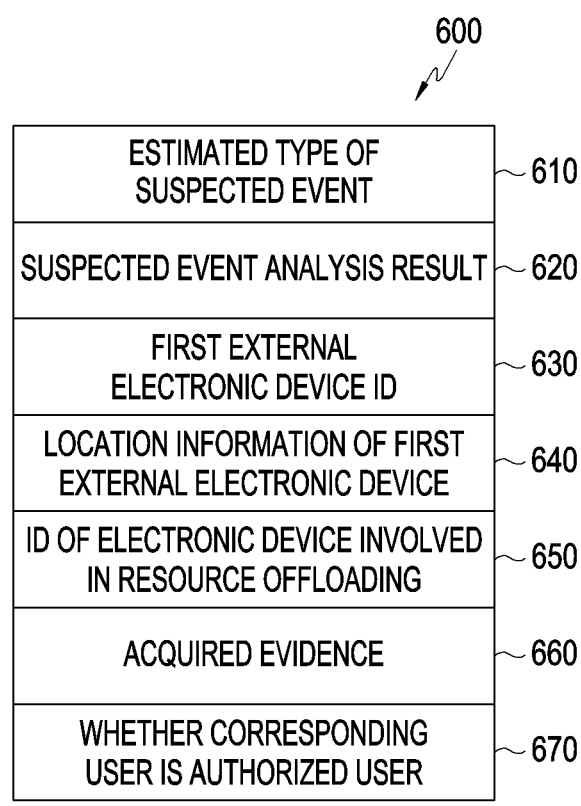
FIG. 6 is a diagram illustrating an example of second information transmitted by a first external electronic device to an electronic device and related to a suspected event analysis result according to various embodiments.

In operation 340, the electronic device 110 according to an embodiment of the disclosure may acquire second information related to an analysis result of the suspected event from the first external electronic device. FIG. 6 is a diagram illustrating an example of second information 600 transmitted by the first external electronic device 120 to the electronic device 110 and related to a suspected event analysis result according to various embodiments. When the second information is described with reference to FIG. 6, the second information 600 according to an embodiment of the disclosure may include at least one piece of information among information 610 on the estimated type of a suspected event, information 620 on a suspected event analysis result, identification information 630 of the first external electronic device 120, location information 640 of the first external electronic device 120, identification information 650 of an electronic device involved in resource offloading, information 660 on obtained evidence, and information 670 indicating whether a user related to the suspected event is an authorized user. The estimated type of the suspected event according to an embodiment of the disclosure may be, for example, a suspected smoking event. The information 620 on the suspected event analysis result according to an embodiment of the disclosure may include information on a result by obtaining analyzing (or inferring) an image by an electronic device (e.g., the second external electronic device 130) dispatched to a location where the suspected event has occurred. For example, the electronic device (e.g., the second external electronic device 130) dispatched to the location where the suspected event has occurred according to an embodiment of the disclosure may analyze an image transmitted from the first external electronic device 120 using an AI model (e.g., a matching model). For example, the second external electronic device 130 according to an embodiment of the disclosure may learn an image of a specific user who is smoking and may then compare the image transmitted from the first external electronic device 120 and the learned image to determine whether a specific object included in the image transmitted from the first external electronic device 120 is smoking. The electronic device involved in the resource offloading according to an embodiment of the disclosure may refer, for example, to an electronic device involved in a process of analyzing the suspected event. For example, when the suspected event is a suspected smoking event and the image is analyzed by the second external electronic device 130, the electronic device involved in the resource offloading may be the second external electronic device 130. The first external electronic device 120 according to an embodiment of the disclosure may transmit identification information of the electronic device involved in the resource offloading, that is, the second external electronic device 130 to the electronic device 110, as the second information 600. The information 660 on the obtained evidence according to an embodiment of the disclosure may include, for example, an image captured by the first external electronic device 120. The information 670 indicating whether the user is the authorized user according to an embodiment of the disclosure may include information indicating whether the smoking user is a user who can enter within a specific area (in other words, whether the smoking user is a legitimate user or an authorized user). In this regard, it will be described in more detail in FIGS. 7A and 7B.

Referring back to FIG. 3, in operation 350, the electronic device 110 according to an embodiment of the disclosure may perform a subsequent procedure based on the obtained second information 600. The subsequent procedure according to an embodiment of the disclosure may include at least one of a procedure for notifying that a suspected event (e.g., a smoking event) has occurred to another external electronic device (e.g., a server of a security company managing an apartment complex), a procedure for transmitting a command causing an external electronic device (e.g., the second external electronic device 130) moved to the vicinity of the first external electronic device 120 to be moved to a default position, to the external electronic device moved to the vicinity of the first external electronic device 120, and a procedure for transmitting a command causing information related to the suspected event, which is stored in the external electronic device moved to the vicinity of the first external electronic device 120, to be deleted, to the external electronic device moved to the vicinity of the first external electronic device 120. After the subsequent procedure is performed, the electronic device 110 according to an embodiment of the disclosure may control another external electronic device (e.g., a mobile robot) so that the other external electronic device (e.g., a mobile robot) is dispatched to the vicinity of the location where the suspected event has occurred. For example, the electronic device 110 according to an embodiment of the disclosure may control the mobile robot so that the mobile robot is dispatched to the vicinity of the location where the suspected event has occurred in order to obtain evidence such as a cigarette butt.

Figure 5A:
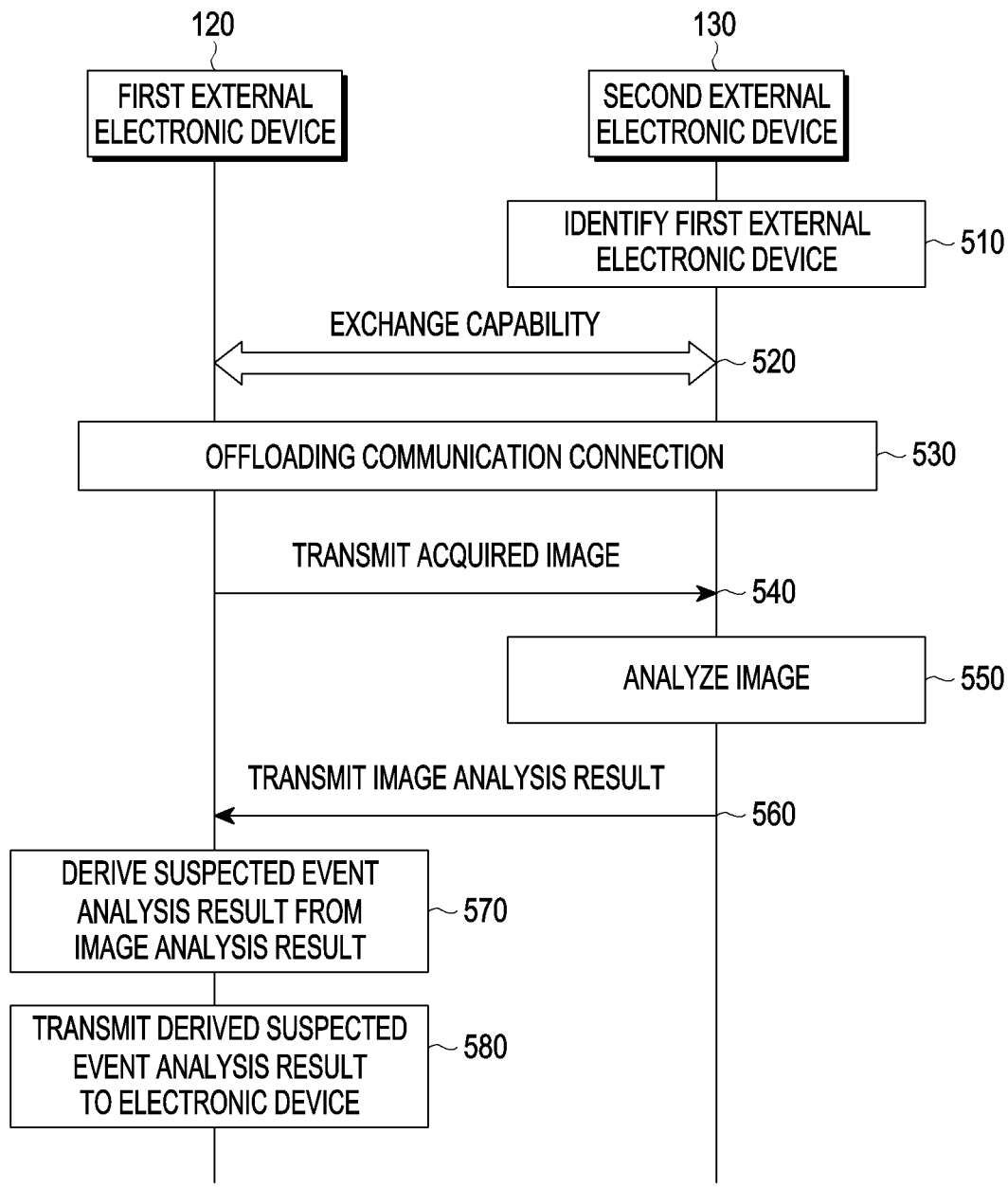
FIG. 5A is a signal flow diagram illustrating an example operation of a first external electronic device that obtains an image analysis result from a second external electronic device, and derives a suspected event analysis result from the image analysis result according to various embodiments.

FIG. 5A is a signal flow diagram illustrating an example operation of the first external electronic device 120 that obtains an image analysis result from the second external electronic device 130, and derives a suspected event analysis result from the image analysis result according to various embodiments.

Referring to FIG. 5A, in operation 510, the second external electronic device 130 (in other words, the electronic device dispatched to the location where the suspected event has occurred) according to an embodiment of the disclosure may identify a first external electronic device 510. The second external electronic device 130 according to an embodiment of the disclosure may identify the first external electronic device 510 by, for example, receiving a beacon signal broadcasted from the first external electronic device 120. In operation 520, the first external electronic device 120 and the second external electronic device 130 according to an embodiment of the disclosure may exchange information on capabilities. According to an embodiment of the disclosure, the second external electronic device 130 may transmit capability information of the second external electronic device 130 to the first external electronic device 120 in response to the reception of the beacon signal. According to an embodiment of the disclosure, the first external electronic device 120 may transmit capability information of the first external electronic device 120 to the second external electronic device 130 in response to the reception of the capability information from the second external electronic device 130. According to such an operation, the first external electronic device 120 and the second external electronic device 130 according to an embodiment of the disclosure may exchange the information on capabilities. When the capability information is received from the second external electronic device 130, the first external electronic device 120 according to an embodiment of the disclosure may identify that the second external electronic device 130 is in proximity through the received capability information. In operation 520, the first external electronic device 120 and the second external electronic device 130 according to an embodiment of the disclosure may identify which components the other party's device includes. In operation 503, the first external electronic device 120 and the second external electronic device 130 according to an embodiment of the disclosure may establish an offloading communication connection. However, according to an embodiment of the disclosure, the first external electronic device 120 may determine whether the second external electronic device 130 has a component (e.g., GPU) for analyzing an acquired image, based on the capability information of the second external electronic device 130 received from the second external electronic device 130. In this case, operation 530 may be performed only when the second external electronic device 130 has the component (e.g., GPU) for analyzing the acquired image. In operation 540, the first external electronic device 120 according to an embodiment of the disclosure may transmit the acquired image to the second external electronic device 130. In operation 550, the second external electronic device 130 according to an embodiment of the disclosure may analyze the transmitted image. For example, the second external electronic device 130 according to an embodiment of the disclosure may analyze the image transmitted from the first external electronic device 120 using an AI model (e.g., a matching model). For example, the second external electronic device 130 according to an embodiment of the disclosure may learn an image of a specific user who is smoking, and may then compare the image transmitted from the first external electronic device 120 and the learned image to determine whether a specific object included in the image transmitted from the first external electronic device 120 is smoking. In operation 560, the second external electronic device 130 according to an embodiment of the disclosure may transmit an image analysis result to the first external electronic device 120. For example, the second external electronic device 130 according to an embodiment of the disclosure may transmit, to the first external electronic device 120, a result inferred that the specific user included in the image is smoking, based on the inferred result obtained using the AI model. In operation 570, the first external electronic device 120 according to an embodiment of the disclosure may derive a suspected event analysis result from the image analysis result. For example, when receiving the result inferred that the specific user is smoking as a result of analyzing the image, the first external electronic device 120 according to an embodiment of the disclosure may derive an analysis result of "while smoking" as a suspected event analysis result. In operation 580, the first external electronic device 120 according to an embodiment of the disclosure may transmit information related to the derived suspected event analysis result (e.g., "while smoking") to the electronic device 110.

Figure 5B:
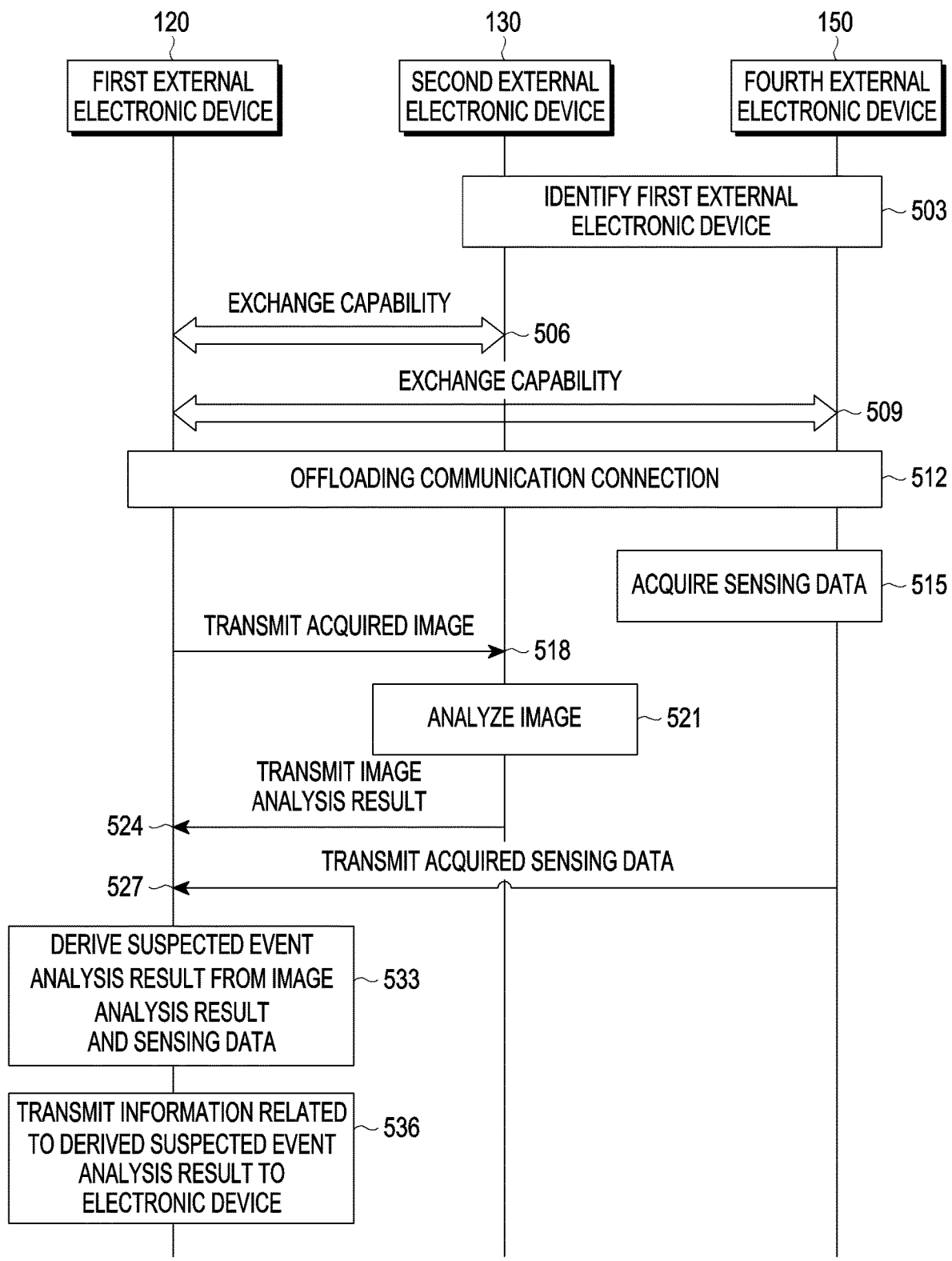
FIG. 5B is a signal flow diagram illustrating an example operation of a first external electronic device that obtains an image analysis result from a second external electronic device, obtains sensing data from a fourth external electronic device, and derives a suspected event analysis result according to various embodiments.

FIG. 5B is a signal flow diagram illustrating an example operation of the first external electronic device 120 that obtains an image analysis result from the second external electronic device 130, obtains sensing data from the fourth external electronic device 150, and derives a suspected event analysis result according to various embodiments.

Referring to FIG. 5B, in operation 503, the second external electronic device 130 and the fourth external electronic device 150 (in other words, electronic devices dispatched to a location where a suspected event has occurred) according to an embodiment of the disclosure may identify the first external electronic device 510. The second external electronic device 130 and the fourth external electronic device 150 according to an embodiment of the disclosure may receive a beacon signal broadcasted from the first external electronic device 120 to identify the first external electronic device 510. In operation 506, the first external electronic device 120 and the second external electronic device 130 according to an embodiment of the disclosure may exchange information on capabilities. According to an embodiment of the disclosure, the second external electronic device 130 and the fourth external electronic device 150 may transmit capability information of the second external electronic device 130 and the fourth external electronic device 150 to the first external electronic device 120, respectively, in response to the reception of the beacon signal. According to an embodiment of the disclosure, the first external electronic device 120 may transmit capability information of the first external electronic device 120 to the second external electronic device 130 and the fourth external electronic device 150, respectively, in response to the reception of the capability information from the second external electronic device 130 and the fourth external electronic device 150. According to this operation, the first external electronic device 120 and the second external electronic device 130 may exchange the information on capabilities with each other and the first external electronic device 120 and the fourth external electronic device 150 may exchange the information on capabilities with each other. When receiving the information on capabilities from each of the second external electronic device 130 and the fourth external electronic device 150, the first external electronic device 120 according to an embodiment of the disclosure may identify that each of the second external electronic device 130 and the fourth external electronic device 150 is in proximity, through the received information on capabilities. In operation 506, the first external electronic device 120 and the second external electronic device 130 according to an embodiment of the disclosure may identify which components the other party's device includes. In operation 509, the first external electronic device 120 and the fourth external electronic device 150 according to an embodiment of the disclosure may exchange the information on capabilities. In operation 509, the first external electronic device 120 and the fourth external electronic device 150 according to an embodiment of the disclosure may identify which components the counterpart's device includes. In operation 512, the first external electronic device 120 and the second external electronic device 130, and the first external electronic device 120 and the fourth external electronic device 150 according to an embodiment of the disclosure may establish an offloading communication connection, respectively. However, according to an embodiment of the disclosure, the first external electronic device 120 may determine whether each of the second external electronic device 130 and the fourth external electronic device 150 has components (e.g., GPU and sensor module) for analyzing an acquired image, based on the capability information of the second external electronic device 130 and the capability information of the fourth external electronic device 150 received from the second external electronic device 130 and the fourth external electronic device 150. In this case, operation 512 may be performed only when each of the second external electronic device 130 and the fourth external electronic device 150 has a component (e.g., the GPU) for analyzing the acquired image and a component (e.g., the sensor module 153) capable of detecting cigarette smoke. In operation 515, the fourth external electronic device 150 according to an embodiment of the disclosure may acquire sensing data. The sensing data according to an embodiment of the disclosure may include data regarding the concentration of the cigarette smoke sensed by the sensor module 153. In operation 518, the first external electronic device 120 according to an embodiment of the disclosure may transmit the acquired image to the second external electronic device 130. In operation 521, the second external electronic device 130 according to an embodiment of the disclosure may analyze the transmitted image. For example, the second external electronic device 130 according to an embodiment of the disclosure may analyze the image transmitted from the first external electronic device 120 using an AI model (e.g., a matching model). For example, the second external electronic device 130 according to an embodiment of the disclosure may learn an image of a specific user who is smoking, and may then compare the image transmitted from the first external electronic device 120 and the learned image to determine whether a specific object included in the image transmitted from the first external electronic device 120 is smoking. In operation 524, the second external electronic device 130 according to an embodiment of the disclosure may transmit an image analysis result to the first external electronic device 120. For example, the second external electronic device 130 according to an embodiment of the disclosure may transmitted an inferred result that the specific user included in the image is smoking, to the first external electronic device 120, based on the inferred result using the AI model. In operation 527, the fourth external electronic device 150 according to an embodiment of the disclosure may transmit the acquired sensing data to the first external electronic device 120. In operation 533, the first external electronic device 120 according to an embodiment of the disclosure may derive a suspected event analysis result from the image analysis result and the sensing data. For example, when the first external electronic device 120 has received the inferred result that the specific user is smoking as the image analysis result and the sensing data (e.g., cigarette smoke concentration) includes data regarding a certain level of the cigarette smoke concentration, the first external electronic device 120 according to an embodiment of the disclosure may derive an analysis result of "while smoking" as a result of analyzing the suspected event. In operation 536, the first external electronic device 120 according to an embodiment of the disclosure may transmit information related to the derived suspected event analysis result (e.g., "while smoking") to the electronic device 110.

Figure 7A:
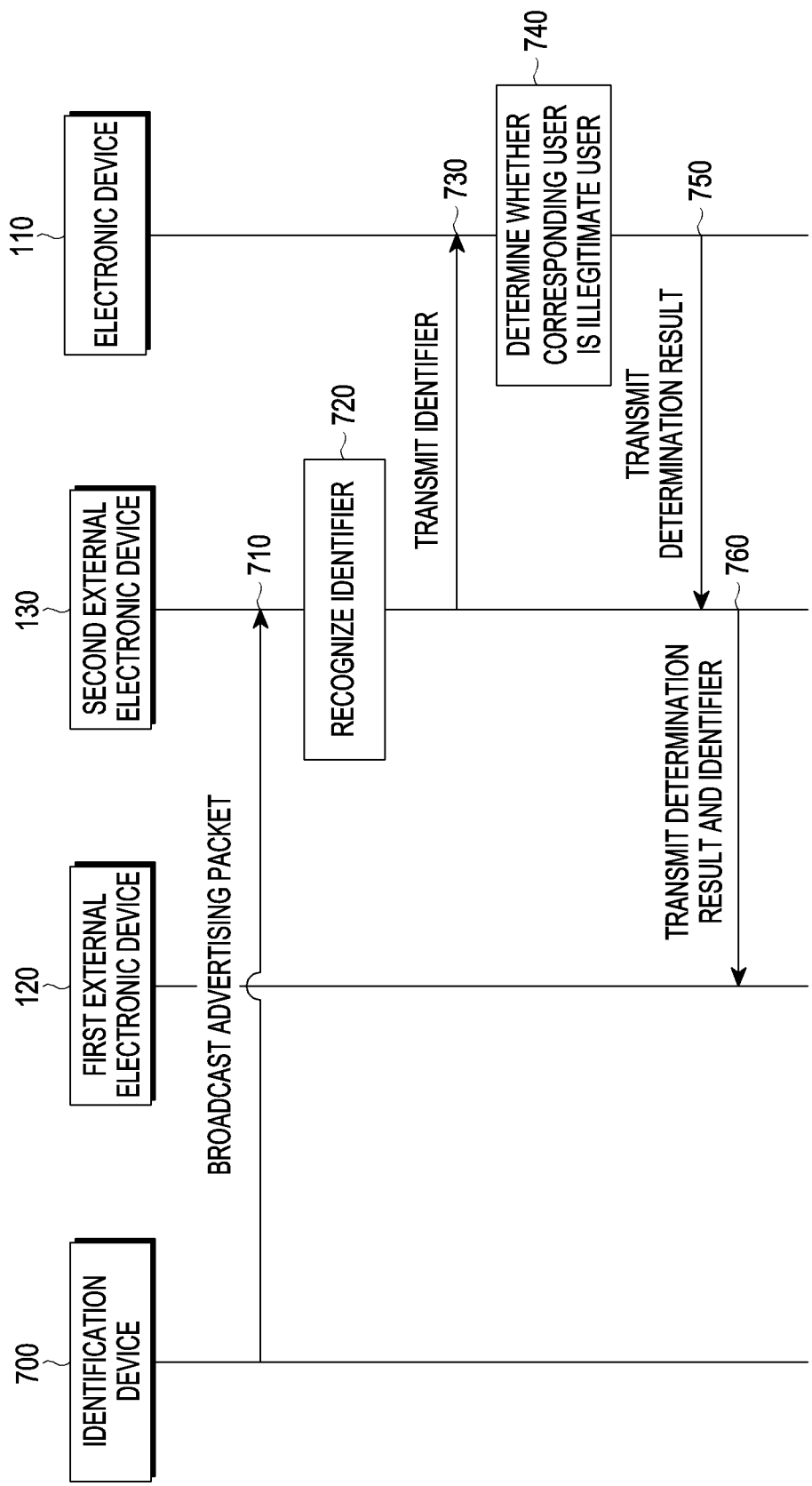
FIG. 7A is a signal flow diagram illustrating an example operation of a second external electronic device that transmits an identifier obtained from an identification device and information on a determination result to a first external electronic device when a user related to a suspected event is a legitimate user (e.g., an authorized user) according to various embodiments.

FIG. 7A is a signal flow diagram illustrating an example operation of a second external electronic device that transmits an identifier obtained from an identification device and information on a determination result to a first external electronic device when a user related to a suspected event is a legitimate user (e.g., an authorized user) according to various embodiments.

Referring to FIG. 7A, in operation 710, an identification device 700 according to an embodiment of the disclosure may broadcast an advertising packet. The identification device 700 according to an embodiment of the disclosure may include a small electronic device that can be attached to a user or a companion animal. The identification device 700 according to an embodiment of the disclosure may communicate with an external electronic device through a communication network (e.g., a short-range communication network) including a communication module. The identification device 700 according to an embodiment of the disclosure may be an electronic device issued to an allowed user and companion animal who can enter and exit a specific area (e.g., an apartment complex). In operation 720, the second external electronic device 130 according to an embodiment of the disclosure may recognize an identifier included in the advertising packet. The identifier according to an embodiment of the disclosure may include identification information (e.g., a flag value) indicating that a user wearing the identification device 700 is an authorized user. In operation 730, the second external electronic device 130 according to an embodiment of the disclosure may transmit the identifier to the electronic device 110. In operation 740, the electronic device 110 according to an embodiment of the disclosure may determine whether a specific user is a legitimate user (in other words, an authorized user) based on the transmitted identifier. The electronic device 110 according to an embodiment of the disclosure may determine whether the specific user is the legitimate user by comparing an identifier previously stored in the memory with the identifier transmitted from the second external electronic device 130. For example, when a flag value stored in the electronic device 110 and a flag value stored in the second external electronic device 130 match each other, the electronic device 110 may determine that the specific user is the legitimate user. In operation 750, the electronic device 110 according to an embodiment of the disclosure may transmit the determination result to the second external electronic device 130. In operation 760, the second external electronic device 130 according to an embodiment of the disclosure may transmit the determination result and/or the identifier to the first external electronic device 120. The first external electronic device 120 according to an embodiment of the disclosure may transmit at least one of the determination result and identifier received from the second external electronic device 130 as information (e.g., information 670 indicating whether the specific user is the authorized user) included in the second information 600, to the electronic device 110.

Figure 7B:
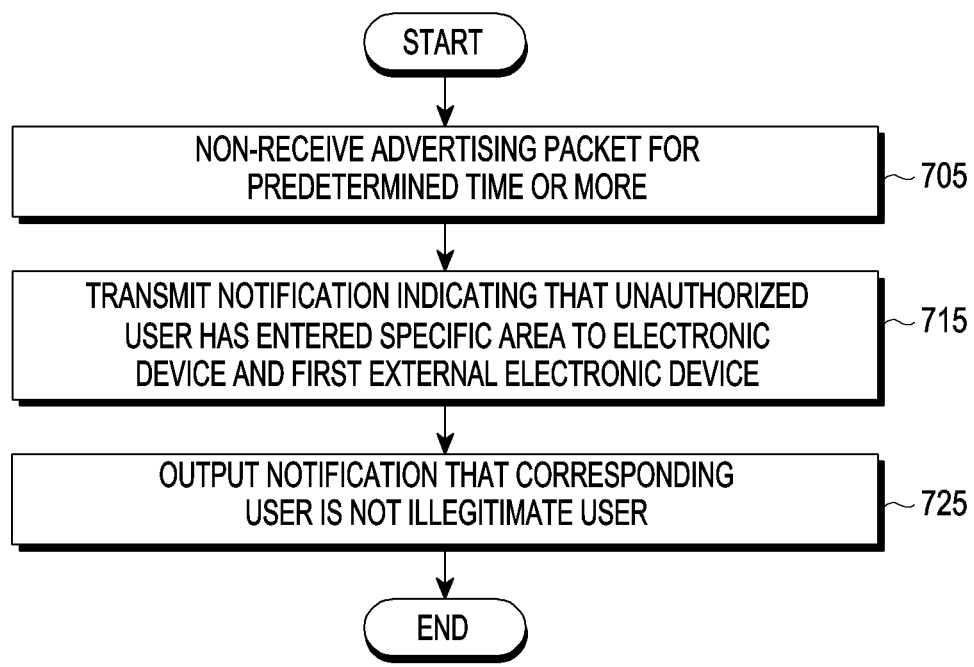
FIG. 7B is a flowchart illustrating an example operation of a second external electronic device that transmits a notification indicating that an illegitimate user (e.g., unauthorized user) has entered a specific area (e.g., an apartment complex) to a first external electronic device when a user related to a suspected event is the illegitimate user according to various embodiments.

FIG. 7B is a flowchart illustrating an example operation of the second external electronic device 130 that transmits a notification indicating that an illegitimate user (e.g., unauthorized user) has entered a specific area (e.g., an apartment complex) to the electronic device 110 and the first external electronic device 120 when a user related to a suspected event is the illegitimate user (e.g., unauthorized user) according to various embodiments.

Referring to FIG. 7B, in operation 705, the second external electronic device 130 according to an embodiment of the disclosure may not receive the advertising packet for a predetermined time or longer. For example, the second external electronic device 130 according to an embodiment of the disclosure may repeat a scanning operation for receiving the advertising packet at a dispatched position a predetermined number of times (e.g., 10 times). When the advertising packet is not received even after the scanning operation is repeated the predetermined number of times (e.g., 10 times), the second external electronic device 130 according to an embodiment of the disclosure may determine that the advertising packet is not received for the predetermined time or longer. In this case, the second external electronic device 130 according to an embodiment of the disclosure may determine that a specific user (e.g., a smoking user) is an unauthorized user. In operation 715, the second external electronic device 130 according to an embodiment of the disclosure may transmit a notification indicating that the unauthorized user has entered a specific area to the electronic device 110 and the first external electronic device 120. In operation 725, the second external electronic device 130 according to an embodiment of the disclosure may output a notification that the user is not a legitimate user. The notification that the user is not a legitimate user may include, for example, a visual notification (e.g., LED lighting) or an audible notification (e.g., output a pre-recorded voice). According to an embodiment of the disclosure, when the first external electronic device 120 receives a notification indicating that the unauthorized user has entered a specific area, the first external electronic device 120 may designate information (e.g., information 670 indicating whether the specific user is an authorized user) included in the second information 600 as a null value and may transmit the designated information to the electronic device 110.

Figure 8A:
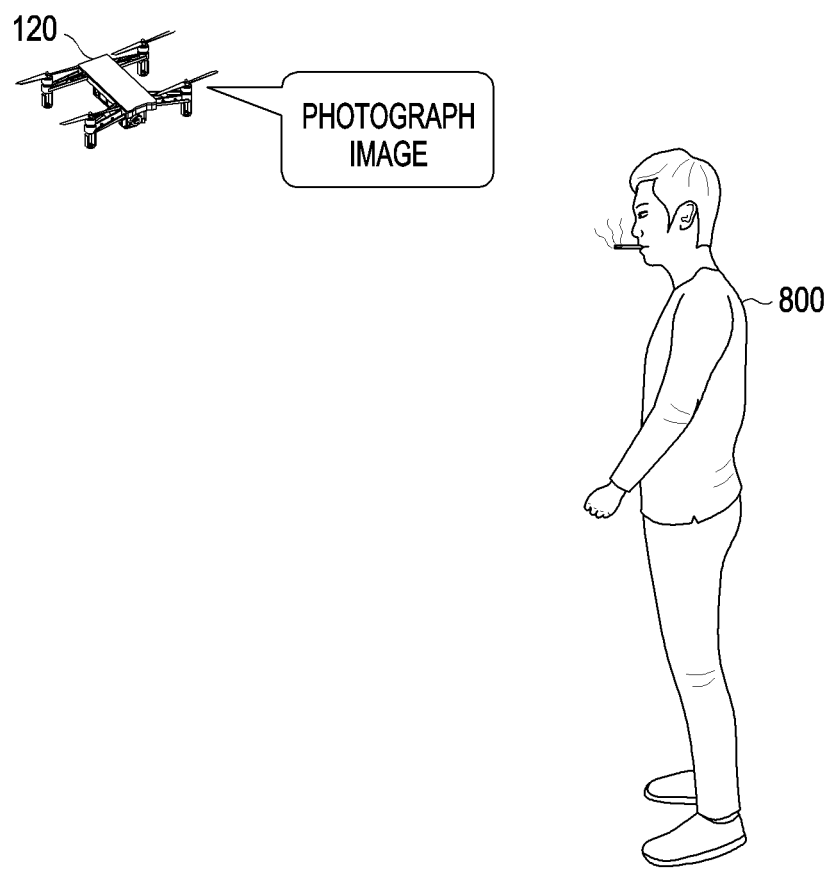
Figure 8B:
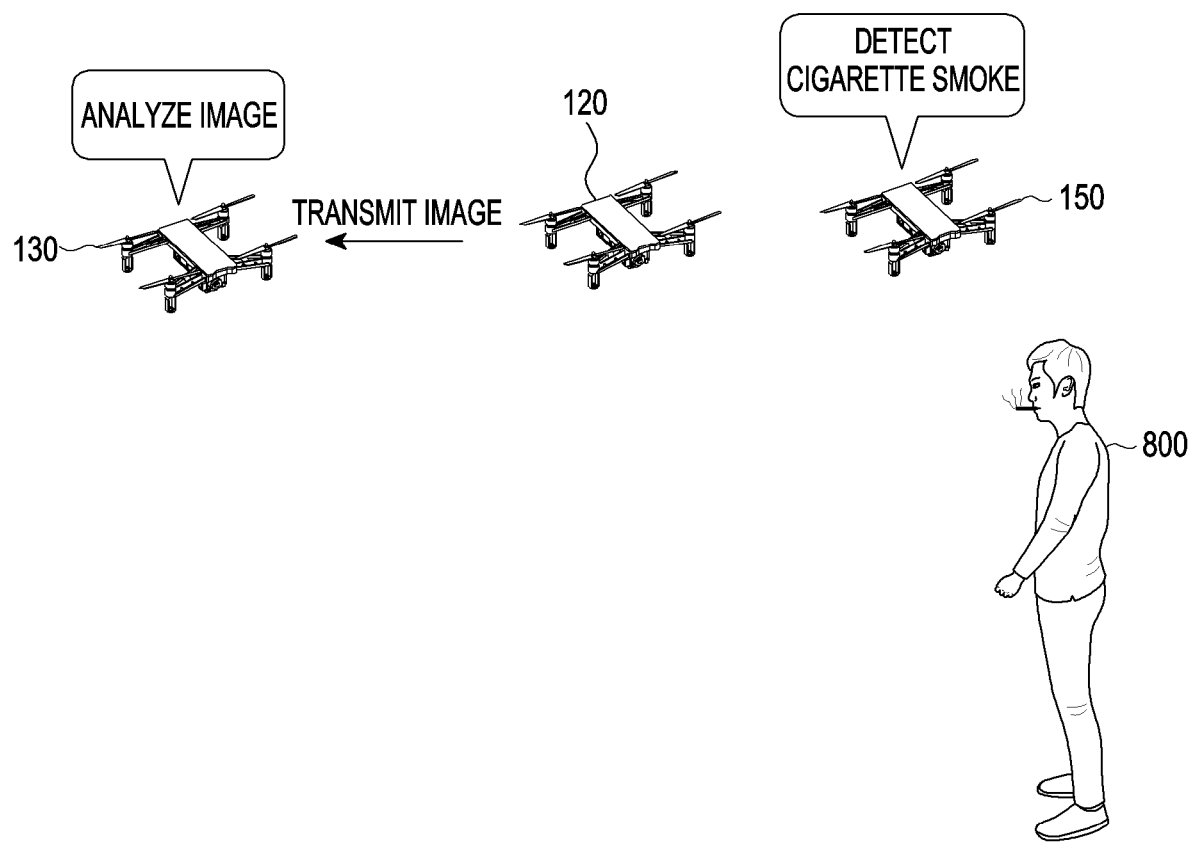

FIGS. 8A, 8B and 8C are diagrams illustrating an example monitoring method according to various embodiments.

Referring to FIG. 8A, the first external electronic device 120 according to an embodiment of the disclosure may monitor (e.g., analyze an image after acquiring the image) a still user 800. When emission of smoke is detected from a user who is walking or in a stationary state during monitoring (e.g., when an object moving irregularly around the user is detected), the first external electronic device 120 according to an embodiment of the disclosure may determine that a suspected smoking event has occurred. The first external electronic device 120 according to an embodiment of the disclosure may monitor the surroundings of the first external electronic device 120 using various algorithms such as a moving object detection method to detect the suspected event.

Referring to FIG. 8B, the external electronic device 120 according to an embodiment of the disclosure may transmit a photographed image (e.g., a still image or a moving picture) to the second external electronic device 130 dispatched to a location where the suspected event has occurred or a location where the first external electronic device 120 exists. The second external electronic device 130 according to an embodiment of the disclosure may analyze the transmitted image. In addition, the fourth external electronic device 150 according to an embodiment of the disclosure may sense whether the smoke around the user is cigarette smoke using a sensor module.

Referring to FIG. 8C, the second external electronic device 130 according to an embodiment of the disclosure may transmit an image analysis result to the first external electronic device 120. The fourth external electronic device 150 according to an embodiment of the disclosure may transmit sensing data to the first external electronic device 120. The first external electronic device 120 according to an embodiment of the disclosure may derive a suspected event analysis result based on the transmitted image analysis result and the sensing data. For example, when it is determined that the smoke around the user is not the cigarette smoke as a result determined based on the sensing data even when "while smoking" is derived as the image analysis result, the first external electronic device 120 according to an embodiment of the disclosure may determine that the user 800 is not smoking. The first external electronic device 120 according to an embodiment of the disclosure may transmit information related to the suspected event analysis result to the electronic device 110.

The electronic device according to various embodiments as set forth herein may be one of various types of devices. The electronic device may include, for example, a portable communication device (e.g., a smart phone), a computer device, a portable multimedia device, a portable medical device, a camera, a wearable device, a home appliance, or the like. The electronic device according to embodiments of the disclosure is not limited to those described above.

It should be appreciated that various embodiments of the disclosure and the terms used therein are not intended to limit the technological features set forth herein to particular embodiments and include various changes, equivalents, or alternatives for a corresponding embodiment. With regard to the description of the drawings, similar reference numerals may be used to designate similar or relevant elements. It is to be understood that a singular form of a noun corresponding to an item may include one or more of the items, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "a first", "a second", "the first", and "the second" may be used to simply distinguish a corresponding element from another, and does not limit the elements in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled/connected with/to the other element directly (e.g., wiredly), wirelessly, or via a third element.

As used in various embodiments of the disclosure, the term "module" may include a unit implemented in hardware, software, or firmware, or any combination thereof, and may be interchangeably used with other terms, for example, "logic," "logic block," "component," or "circuit". The "module" may be a minimum unit of a single integrated component adapted to perform one or more functions, or a part thereof. For example, the "module" may be implemented in the form of an application-specific integrated circuit (ASIC).

Various embodiments as set forth herein may be implemented as software including one or more instructions that are stored in a storage medium that is readable by a machine (e.g., the electronic device 110). For example, a processor (e.g., the processor 112) of the machine (e.g., the electronic device 110) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium.

Herein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment of the disclosure, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments of the disclosure, each element (e.g., module or program) of the above-described elements may include a single entity or multiple entities, and some of the multiple entities may be separately disposed in another element. According to various embodiments, one or more of the above-described elements or operations may be omitted, or one or more other elements or operations may be added. Alternatively or additionally, a plurality of elements (e.g., modules or programs) may be integrated into a single element. In such a case, according to various embodiments, the integrated element may still perform one or more functions of each of the plurality of elements in the same or similar manner as they are performed by a corresponding one of the plurality of elements before the integration. According to various embodiments, operations performed by the module, the program, or another element may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:
a communication module comprising communication circuitry,
at least one processor comprising processing circuitry, and
memory, wherein the memory stores instructions which, when executed by the at least one processor, cause the electronic device to:
control the communication module to acquire first information related to an event from a first external electronic device including a first application processor (AP) and a first camera, wherein the first information includes information on a captured image by the first camera of the first external electronic device,
determine a second external electronic device and a third external electronic device to be dispatched to a location where the event has occurred, wherein the second external electronic device includes a second AP, a graphic processing unit (GPU), a neural processing unit (NPU), and a second camera, wherein a resolution of the second camera is higher than a resolution of the first camera, and wherein the third external electronic device includes a third AP corresponding to the first AP, a third camera corresponding to the first camera, and a sensor configured to detect smoke,
control the second external electronic device and the third external electronic device so that the second external electronic device and third external electronic device are dispatched to a vicinity of the location where the event has occurred while controlling to maintain a location where the first external electronic device is located, wherein the captured image transmitted from the first external electronic device is analyzed, using an AI model, by the second external electronic device, wherein a first analysis result for the captured image is generated by the second external electronic device, wherein the first analysis result is transmitted from the second external electronic device to the first external electronic device, wherein a second analysis result for the smoke detected by the third external electronic device is generated by the third external electronic device and transmitted from the third external electronic device to the first external electronic device, and wherein, when the first analysis result and the second analysis result are processed by the first external electronic device, a priority of the second analysis result is prior to the first analysis result when the first analysis result and the second analysis result are indicating a different result from each other,
obtain second information on a third analysis result of the event from the first external electronic device generated based on the first analysis result and the second analysis result, and
transmit, to a management server, information on obtained second information.

2. The electronic device of claim 1, wherein the first information includes at least one of: information on the location where the event has occurred, information on a time at which the event has been discovered, identification information of the first external electronic device, location information of the first external electronic device, or information on an estimated type of the event.

3. The electronic device of claim 2, wherein the instructions, when executed, cause the electronic device to:
determine a candidate electronic device to be dispatched to the location where the event has occurred based on at least one piece of information of information on the type of the event and capability information of the first external electronic device.

4. The electronic device of claim 1, wherein the instructions, when executed, cause the electronic device to control another external electronic device so that the other external electronic device is dispatched to the vicinity of the location where the event has occurred based on the transmitted information.

5. The electronic device of claim 1, wherein the second information includes at least one of: information on an estimated type of the event, information on an analysis result of the event, identification information of the first external electronic device, location information of the first external electronic device, identification information of an electronic device involved in resource offloading, information on evidence acquired in relation to the event, or information indicating whether a user related to the event is an authorized user.

6. A non-transitory storage medium storing one or more programs, the one or more programs comprising executable instructions, when executed by at least one processor of an electronic device, cause the electronic device to:
  acquire first information related to an event from a first external electronic device, including a first application processor (AP) and a first camera, through a communication module, wherein the first information includes information on a captured image by the first camera of the first external electronic device,
  determine a second external electronic device and a third external electronic device to be dispatched to a location where the event has occurred, wherein the second external electronic device includes a second AP, a graphic processing unit (GPU), a neural processing unit (NPU), and a second camera, and wherein a resolution of the second camera is higher than a resolution of the first camera, wherein the third external electronic device includes a third AP corresponding to the first AP, a third camera corresponding to the first camera, and a sensor configured to detect smoke,
  control the second external electronic device and the third external electronic device so that the second external electronic device and third external electronic device are dispatched to a vicinity of the location where the event has occurred while controlling to maintain a location where the first external electronic device is located, wherein the captured image transmitted from the first external electronic device is analyzed, using an AI model, by the second external electronic device, wherein a first analysis result for the captured image is generated by the second external electronic device, wherein the first analysis result is transmitted from the second external electronic device to the first external electronic device, wherein a second analysis result for the smoke detected by the third external electronic device is generated by the third external electronic device and transmitted from the third external electronic device to the first external electronic device, and wherein, when the first analysis result and the second analysis result are processed by the first external electronic device, a priority of the second analysis result is prior to the first analysis result when the first analysis result and the second analysis result are indicating a different result from each other,
  obtain second information on a third analysis result of the event from the first external electronic device generated based on the first analysis result and the second analysis result, and
  transmit, to a management server, information on the obtained second information.

7. The non-transitory storage medium of claim 6, wherein the first information includes at least one of: information on the location where the event has occurred, information on a time at which the event has been discovered, identification information of the first external electronic device, location information of the first external electronic device, or information on an estimated type of the event.

8. The non-transitory storage medium of claim 6, wherein the instructions, when executed by at least one processor of the electronic device, cause the electronic device to:
  control another external electronic device so that the other external electronic device is dispatched to the vicinity of the location where the event has occurred based on the transmitted information.

9. The non-transitory storage medium of claim 6, wherein the second information includes at least one of: information on an estimated type of the event, information on an analysis result of the event, identification information of the first external electronic device, location information of the first external electronic device, identification information of an electronic device involved in resource offloading, information on evidence acquired in relation to the event, or information indicating whether a user related to the event is an authorized user.

10. The non-transitory storage medium of claim 6, wherein the instructions, when executed by at least one processor of the electronic device, cause the electronic device to:
  obtain information indicating whether a user related to the event is an authorized user from the second external electronic device, and
  determine whether the user related to the event is the authorized user by comparing with data stored in the electronic device.

* * * * *